United States Patent [19]
Aoki et al.

[11] Patent Number: 6,140,801
[45] Date of Patent: Oct. 31, 2000

[54] CIRCUIT AND METHOD FOR CHARGING A BATTERY BASED ON AN ALLOWABLE DISSIPATION OF A HOUSING

[75] Inventors: Shinobu Aoki; Tetsuo Tateishi, both of Aichi, Japan

[73] Assignee: Kabushiki Kaisha Toyoda Jidoshokki Seisakusho, Kariya, Japan

[21] Appl. No.: 09/349,008

[22] Filed: Jul. 7, 1999

[30] Foreign Application Priority Data

Jul. 8, 1998 [JP] Japan ................................. 10-192201

[51] Int. Cl.[7] .......................... H01M 10/44; H01M 10/46
[52] U.S. Cl. ............................................ 320/132; 320/149
[58] Field of Search .................................... 320/132, 135, 320/149, FOR 142, FOR 147, DIG. 21

[56] References Cited

U.S. PATENT DOCUMENTS 5,698,964 12/1997 Kates et al. .
5,721,481 2/1998 Narita et al. .
5,723,970 3/1998 Bell .

FOREIGN PATENT DOCUMENTS 63-003540 1/1988 Japan .
3-034640 4/1991 Japan .

*Primary Examiner*—Edward H. Tso
*Attorney, Agent, or Firm*—Woodcock Washburn Kurtz Mackiewicz & Norris LLP

[57] ABSTRACT

A DC/DC converter generates a voltage required by a load. A battery supplies electric power for the load as necessary. A charging circuit charges the battery. The load, the DC/DC converter, the battery, and the charging circuit are contained in a housing. The charging circuit controls a charging current to be supplied for the battery such that a total consumed electric power (a sum of electric power consumed by the load, the DC/DC converter, and the charging circuit) dose not exceed the allowable dissipation of the housing.

9 Claims, 10 Drawing Sheets

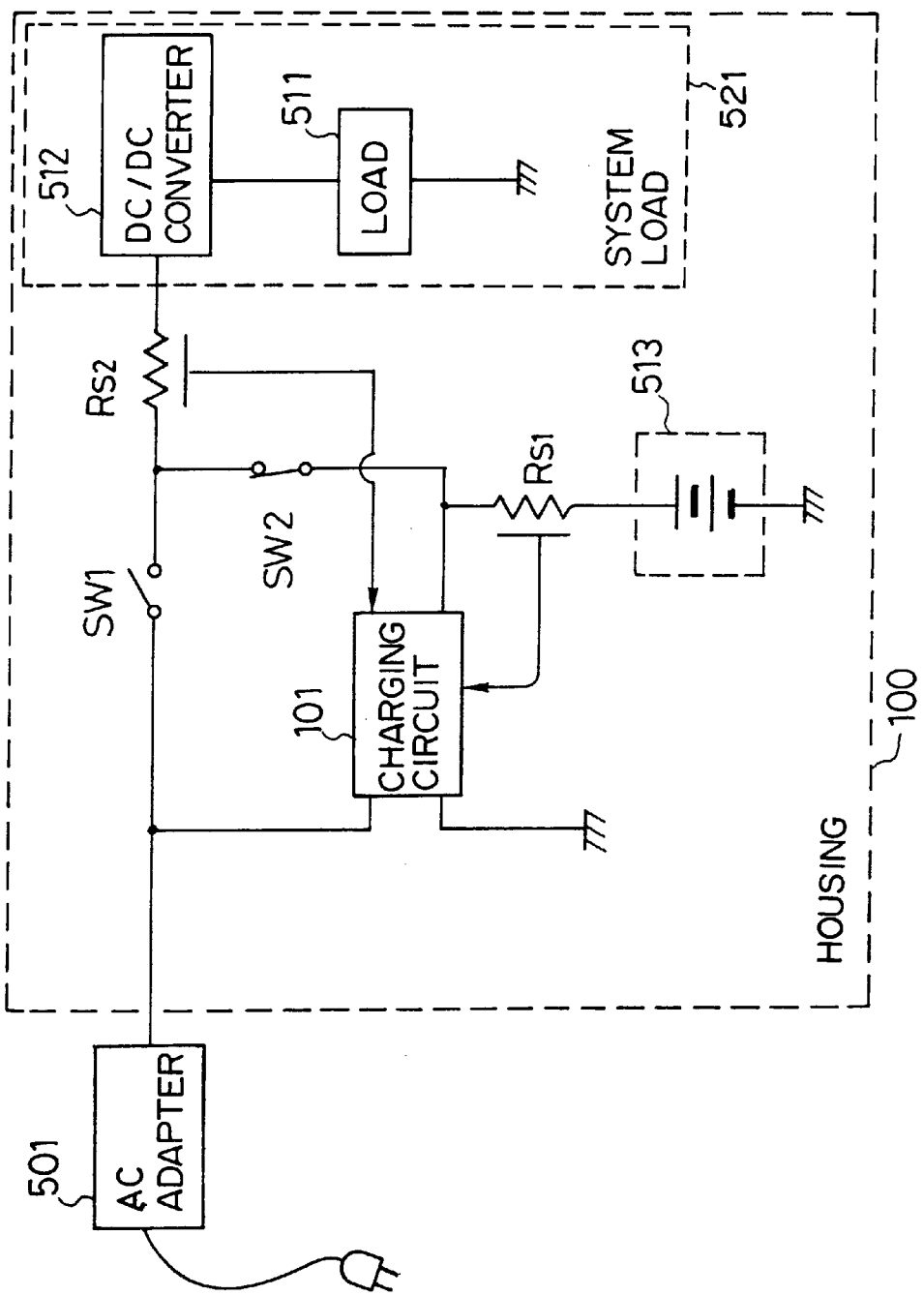
F I G. 5

CIRCUIT AND METHOD FOR CHARGING A BATTERY BASED ON AN ALLOWABLE DISSIPATION OF A HOUSING

BACKGROUND OF THE INVENTION

1. Field of the Invention

The present invention relates to a circuit for charging a secondary cell, and more specifically to a charging circuit for charging a battery provided in a housing for containing an electronic appliance, such as may be found in connection with notebook-sized personal computers.

2. Description of the Related Art

Lately, a large number of information processing devices or communications devices are being provided with batteries (secondary cell). For example, a notebook-sized personal computer is basically AC-powered when it is connected to an AC power supply, and battery-powered when the AC power supply is not provided.

A battery in a device connectable to an AC power supply is normally charged while the device is powered by the AC power supply. Practically, when the amount of power consumed by a system load of the device becomes small, residual power is used to charge the battery. For example, the power consumption of a personal computer constantly changes with time depending on whether or not a key operation is being performed, depending on whether or not a hard disk is being accessed, depending and on the display state, etc. The charging device charges the battery when the power consumption of the personal computer becomes small.

FIG. 1 is a block diagram of the information processing device provided with an existing charging circuit. In this example, it is assumed that the information processing device is a notebook-sized personal computer (hereinafter referred to simply as a notebook PC).

An AC adapter 501 is, for example, an AC/DC converter, and supplies a predetermined direct current voltage for a notebook PC. A load 511 is a circuit containing the CPU, display device, disk drive circuit, etc. of the notebook PC. A DC/DC converter 512 generates a voltage requested by the load 511 from the output of the AC adapter 501 or a battery 513, and supplies it to the load 511. A charging circuit 514 charges the battery 513 with electric power provided by the AC adapter 501. The load 511, the DC/DC converter 512, the battery 513, and charging circuit 514 are contained in a housing 510.

With the above described configuration, when the AC adapter 501 is connected to an AC power supply, a switch SW2 is basically opened when a switch SW1 is closed, and the notebook PC is driven by the power obtained through the AC adapter 501. On the other hand, when the AC adapter 501 is not connected to AC power supply, the switch SW2 is closed when the switch SW1 is opened, and the notebook PC is driven by the power obtained from the battery 513.

The electric current (or electric power) with which the battery 513 is charged has conventionally been determined based on a parameter relating to the ability of the AC adapter 501. As an example, the charging current has been controlled such that the total electric power (sum of consumed electric power and electric power charged in the battery) supplied for the notebook PC may not exceed the allowable output power of the AC adapter 501.

FIG. 2 shows the conventional charging method. In the conventional charging method, the electric power consumed by a system load is monitored. When the monitored value becomes small, the battery 513 is charged. The "electric power consumed by a system load" is represented by a sum of the electric power consumed by the load 511 and the DC/DC converter 512, and changes with time depending on the operation of the load 511. Therefore, for example, from T1 to T2, the battery 513 is charged with a large electric current while from T2 to T3, it is charged with a small electric current. Since the amount of the electric power consumed by the system load becomes large at and after time T3, the battery 513 is not charged at all.

As described above, in the conventional charging method, the charging current or charging power depends on a parameter relating to the ability of an AC adapter. A charging circuit for determining the charging current or charging power based on the parameter relating to the ability of an AC adapter is disclosed by the U.S. patent (U.S. Pat. No. 5,723,970).

Recently, the amount of heat generated by various information processing devices such as notebook PCs, etc. has considerably increased as a results of, for example, high-speed CPUs. On the other hand, a number of users request smaller notebook PCs, etc.

However, when a housing of a device is made smaller to satisfy the users' requests, the radiation of heat is necessarily lowered. In addition, specifications for heat or temperature have become strict lately. For these reasons, it has become more important these days to design a housing of a device with more careful consideration of the relationship between the shape of the housing of a device and the amount of the heat generated by the device.

Under this situation, there are some problems to be solved with the conventional charging method. That is, in the conventional charging method, the charging current or charging power has been determined based on the parameter relating to the ability of an AC adapter as described above. However, the conventional method has not been designed with the consideration of radiation ability.

SUMMARY OF THE INVENTION

The present invention aims at providing a charging circuit for controlling the charge for a battery in a device with the radiation ability of the device taken into account.

The charging circuit according to the present invention is provided in a housing which contains a load and a battery capable of supplying electric power for the load, and charges the battery. The charging circuit according to the present invention includes a consumed power detection unit which detects total electric power consumed in the above described housing, and a control unit which controls the electric current with which the battery is charged based on the total consumed power detected by the consumed power detection unit, and the allowable dissipation of the housing.

The amount of the generated heat from the housing depends on the total electric power consumed in the housing. Therefore, to keep the amount of the generated heat from the housing within a constant value (allowable dissipation of the housing), the total amount of the electric power consumed in the housing is monitored, and the charging of the battery should be controlled such that the total consumption amount of the electric power can be smaller than the allowable dissipation of the housing.

To satisfy the above described condition, the control unit controls the electric current, with which the battery is charged, based on the predetermined allowable dissipation of the housing, and dynamical comparison of that with the total amount of electric power consumed in the housing.

BRIEF DESCRIPTION OF THE DRAWINGS

FIG. 5 is a block diagram of the device provided with the charging circuit according to the third embodiment of the present invention;

DESCRIPTION OF THE PREFERRED EMBODIMENTS

The embodiments of the present invention are described below by referring to the attached drawings. It is assumed that, in the following description, the device provided with the charging circuit according to the present invention is a notebook PC.

Figure 1:
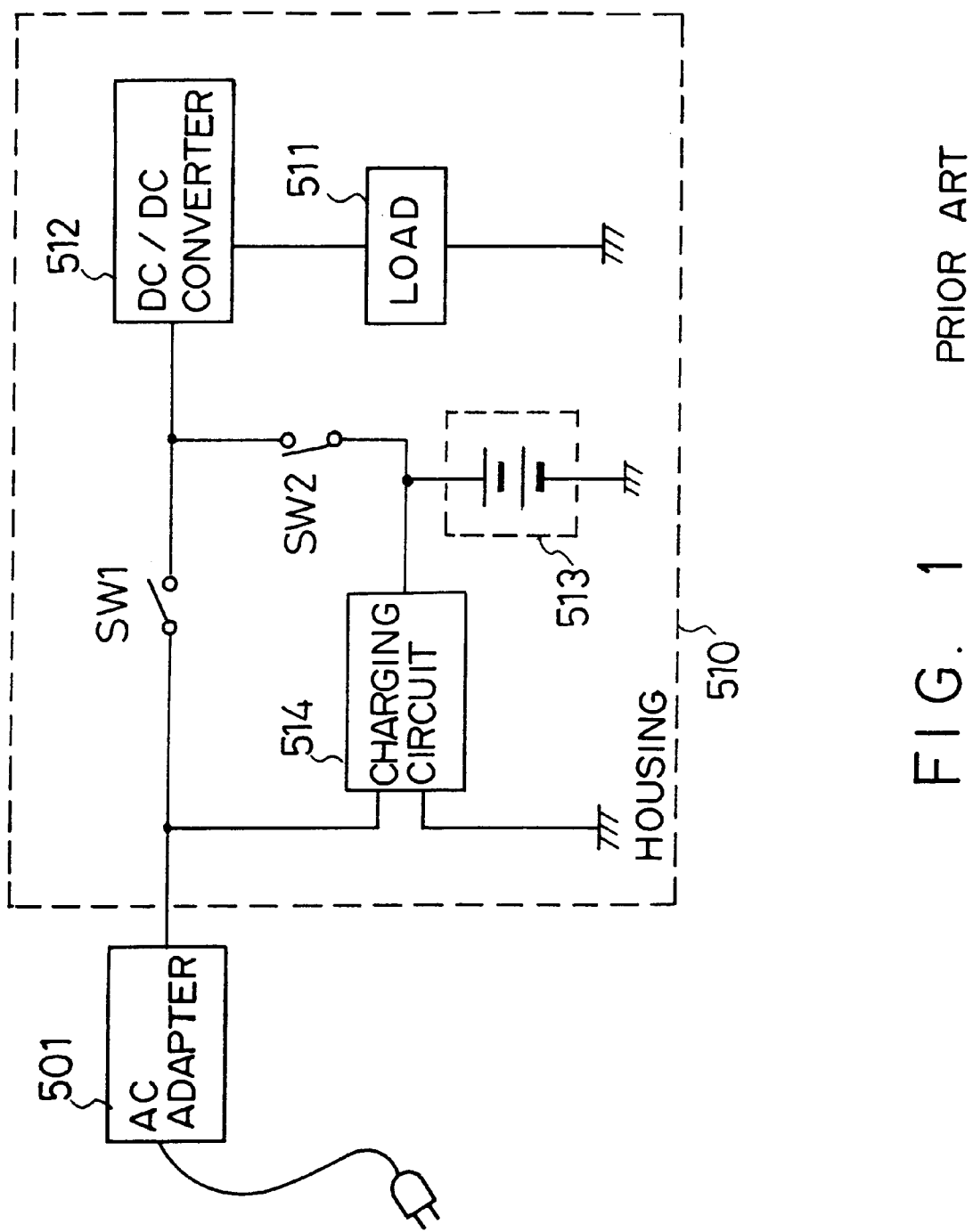
FIG. 1 is a block diagram of the information processing device provided with the conventional charging circuit.
Figure 2:
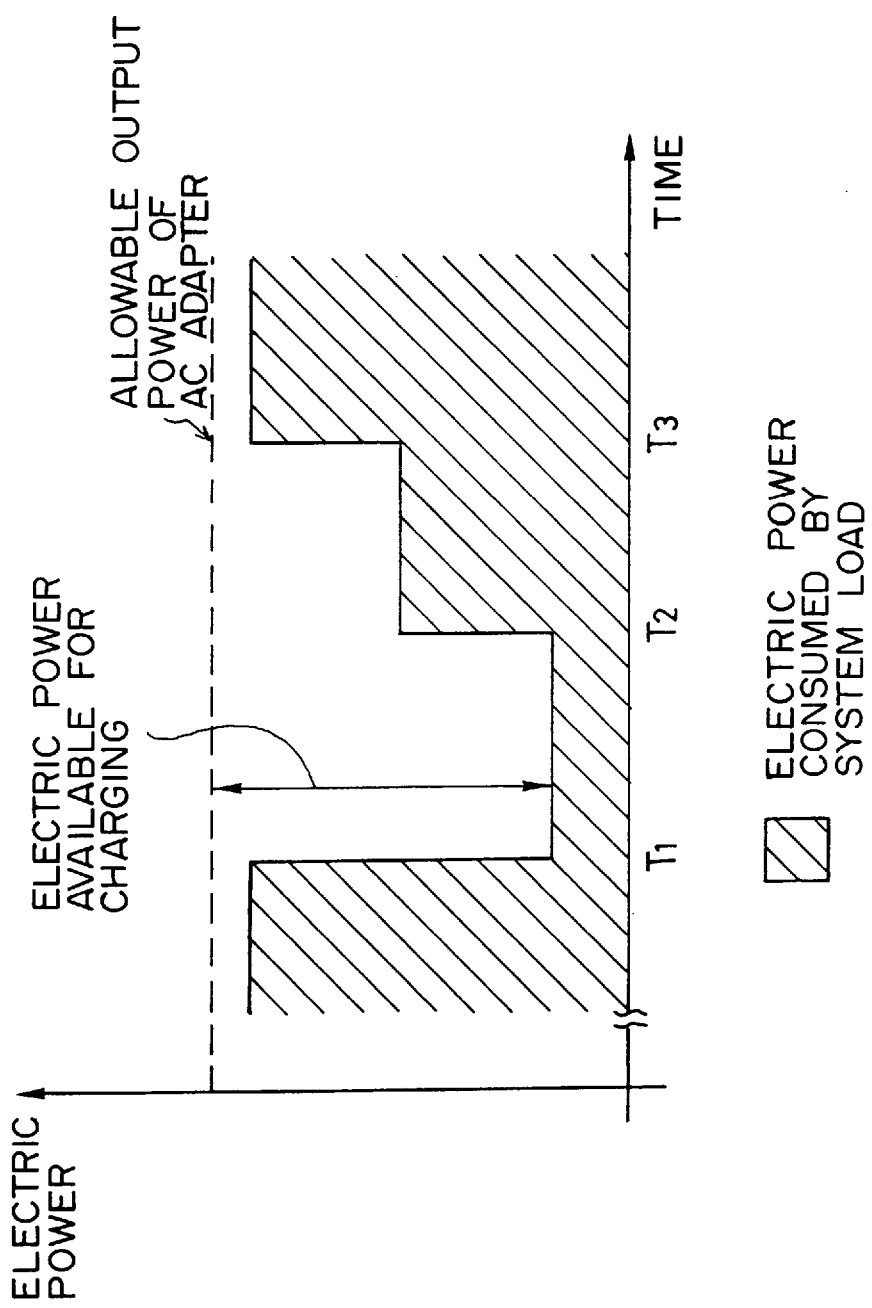
FIG. 2 shows the conventional charging method.
Figure 3:
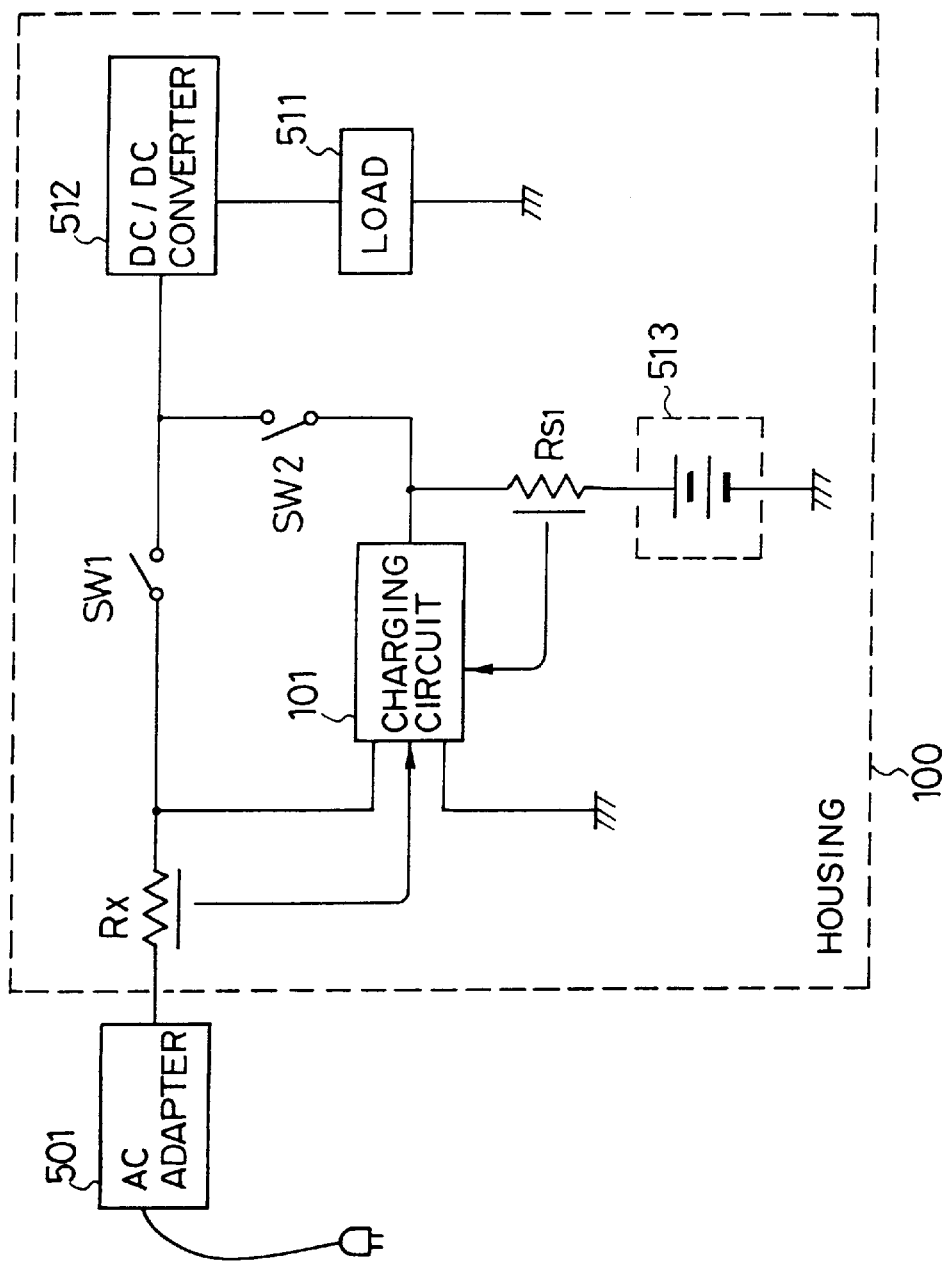
FIG. 3 is a block diagram of the device provided with the charging circuit according to the first embodiment of the present invention.
Figure 4:
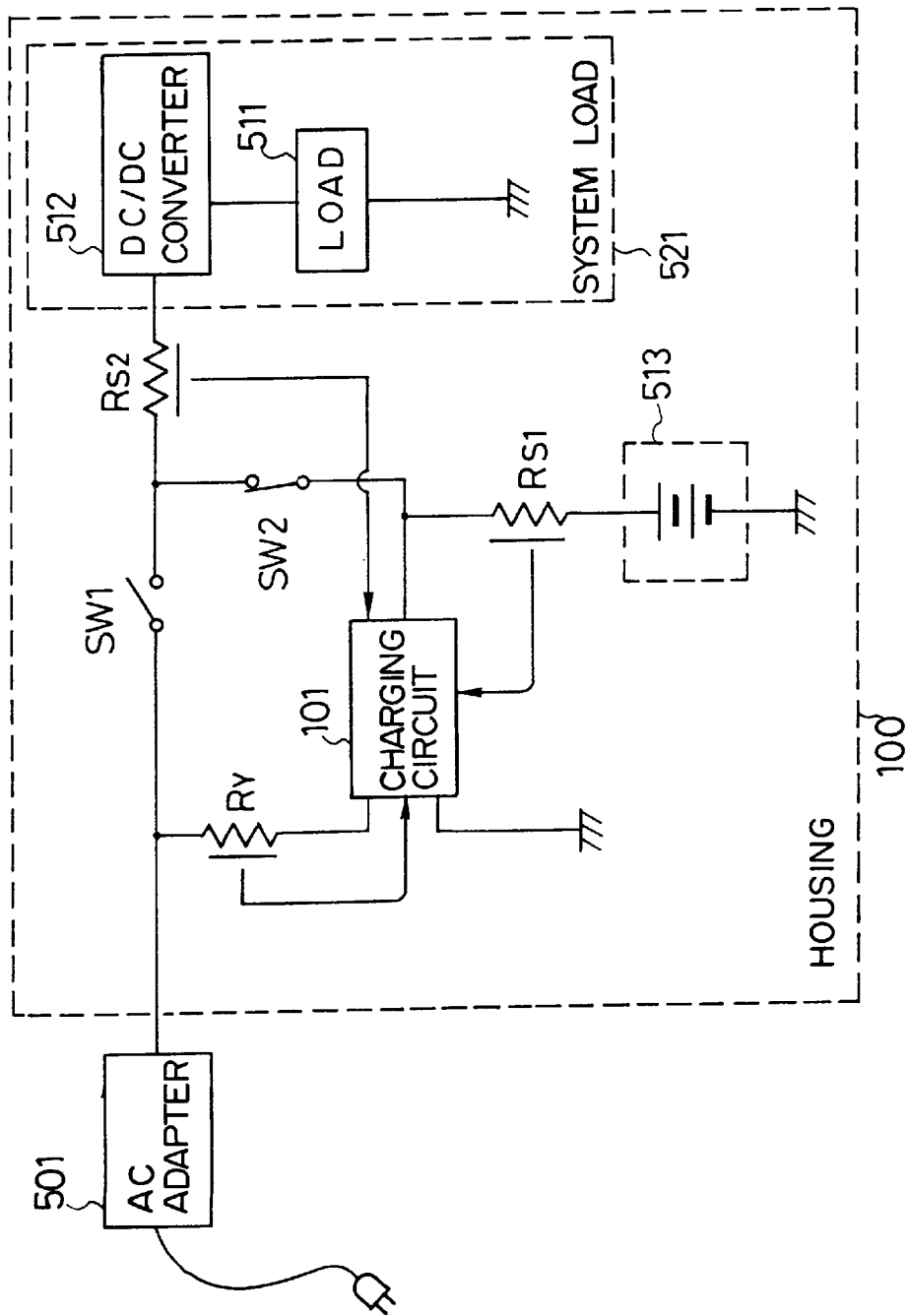
FIG. 4 is a block diagram of the device provided with the charging circuit according to the second embodiment of the present invention.

FIGS. 3 through 5 are block diagrams of the device provided with the charging circuit according to the first through third embodiments of the present invention. The AC adapter 501, the load 511, the DC/DC converter 512, the battery 513, and the switches SW1 and SW2 are basically the same as those described by referring to FIG. 1. In addition, the load 511, the DC/DC converter 512, the battery 513, the switches SW1 and SW2, and a charging circuit 101 are contained in a housing 100.

In each embodiment of the present invention, the charging current with which the battery 513 is charged is controlled in consideration of the allowable dissipation of the housing 100. It is assumed that the allowable dissipation of the housing 100 is known. The allowable dissipation of the housing refers to the allowable amount of generated heat defined in association with the radiation ability depending on the shape, etc. of the housing. For example, if the housing is small, its allowable dissipation is generally small. In addition, for example, if a heat sink is mounted on a housing, allowable dissipation of the housing will be larger. As described above, a number of factors are considered in designing the radiation of heat of a housing. The allowable dissipation of a housing can be directly obtained by experiment, or can be obtained through a simulation.

The charging circuit 101 estimates the total amount of heat generated in the housing 100, and controls the electric current to be provided for the battery 513 such that the total amount of heat does not exceed the allowable dissipation of the housing 100. The total amount of heat generated in the housing 100 is proportional to the sum of the electric power consumed in the housing 100 (total electric power consumption). As well known by a person of ordinary skill in the art, the electric power used to charge a secondary cell (the battery 513 in this embodiment), etc. does not generate heat. Therefore, to estimate the amount of heat generated in the housing 100, the total electric power consumed in the housing 100 is detected. The total electric power P consumed in the housing 100 equal a sum of electric power Q1 consumed by the load 511, electric power Q2 consumed by the DC/DC converter 512, and electric power R consumed by the charging circuit 101. In the following description, the sum of electric power consumed by the load 511 and the DC/DC converter 512 can be referred to as electric power Q consumed by a system load 521, as shown in FIG. 4.

$$P=Q1+Q2+R=Q+R$$

The charging methods according to the first through third embodiments of the present invention are different from each other in their methods of detecting the total electric power P consumed by the respective housings 100.

In the charging method according to the first embodiment, since the electric power used to charge the battery 513 does not generate heat, the total electric power P is obtained by subtracting the electric power T charged in the battery 513 from the input electric power S provided by the AC adapter 501.

$$P=S-T$$

According to the first embodiment, a resistor Rx for detecting the electric current supplied from the AC adapter 501 to the housing 100, and a resistor Rs1 for detecting the electric current supplied for the battery 513 are provided as shown in FIG. 3 to detect the above described parameters. The input electric power S supplied from the AC adapter 501 is obtained as a product of the electric current flowing through the resistor Rx and the input voltage of the charging circuit 101. The electric power T for charging the battery 513 is obtained as a product of the electric current flowing through the resistor Rs1 and the output voltage from the charging circuit 101.

In the charging method according to the second embodiment, the total electric power P consumed in the housing 100 is obtained by adding the electric power R consumed by the charging circuit 101 to the electric power Q consumed by the system load 521. The electric power R consumed by the charging circuit 101 is obtained as a difference between the electric power input to the charging circuit 101 and the electric power output from the charging circuit 101.

According to the second embodiment, a resistor Ry for detecting the electric current supplied for the charging circuit 101, a resistor Rs1 for detecting the electric current supplied for the battery 513, and a resistor Rs2 for detecting the electric current supplied for the system load 521 are provided as shown in FIG. 4 to detect the parameters. The electric power supplied for the charging circuit 101 is obtained as a product of the electric current flowing through the resistor Ry and the input voltage of the charging circuit 101. The electric power output from the charging circuit 101 is obtained as a product of the electric current flowing through the resistor Rs1 and the output voltage from the charging circuit 101. In addition, the electric power supplied for the system load 521 is obtained as a product of the electric current flowing through the resistor Rs2 and the output voltage from the AC adapter 501.

In the charging method according to the third embodiment of the present invention, as in the second embodiment, the total electric power P consumed in the housing 100 is obtained by adding the electric power R consumed by the charging circuit 101 to the electric power Q consumed by the system load 521. However, according to the third embodiment, the electric power R consumed by the charging circuit 101 is obtained based on the electric power output from the charging circuit 101 and the efficiency of the charging circuit 101. That is, an input electric power to the charging circuit 101 is obtained based on the output electric power from the charging circuit 101 and the efficiency of the charging circuit 101. Afterwards, the electric power R consumed by the charging circuit 101 is obtained by subtracting the output electric power from the charging circuit 101 from the input electric power to the charging circuit 101. It is assumed that the efficiency of the charging circuit 101 is known.

According to the third embodiment of the present invention, a resistor Rs1 for detecting the electric current supplied for the battery 513, and a resistor Rs2 for detecting the electric current for the system load 521 are provided as shown in FIG. 5 to detect the above described parameters. The method for obtaining the electric power output from the charging circuit 101 and the electric power supplied for the system load 521 using the above described resistors is the same as in the second embodiment.

According to the second and third embodiments of the present invention, the amount of loss by the resistors in the battery 513 is not taken into account (or cannot be directly detected). To improve the precision in detecting consumed electric power, the function of correcting the amount of loss in the battery 513 is to be provided.

Figure 6:
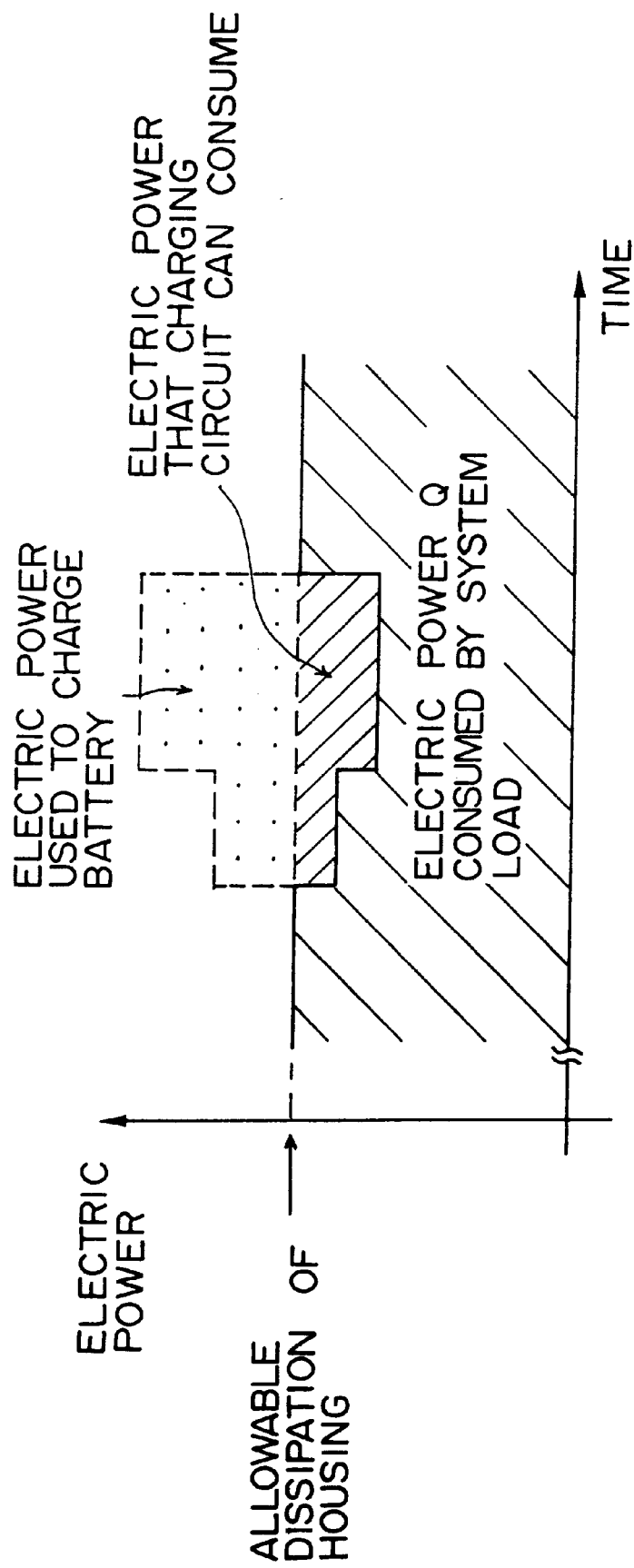
FIG. 6 shows the charging method according to the first through third embodiments of the present invention.

FIG. 6 shows the charging method according to the first through third embodiments of the present invention. According to the charging method of the present invention, the total electric power consumed in the housing 100 is limited. In this example, the total electric power consumed in the housing 100 equals a sum of the electric power Q consumed by the system load 521 and the electric power R consumed by the charging circuit 101. Therefore, if the electric power Q consumed by the system load 521 becomes low, then the electric power that the charging circuit 101 can increases correspondingly. The charging circuit 101 consumes more electric power when it charges the battery 513 with larger current.

While the charging circuit 101 is charging the battery 513, the electric power S supplied from the AC adapter 501 to the housing 100 can be larger than the allowable dissipation of the housing 100. However, the electric power used to charge the battery 513 does not generate heat. Accordingly, there occurs no problems of heat generation according to the present invention if the total electric power P consumed in the housing 100 is controlled not to exceed the allowable dissipation of the housing 100.

Thus, since the charging circuit according to the present invention operates while monitoring the total electric power consumed in the housing 100, the amount of the generated heat from the housing 100 is limited. As a result, the thermal design of the housing 100 can be easily prepared. The allowable dissipation of the housing 100 can be, for example, made to match the maximum value of the electric power consumed by the system load 521.

On the other hand, since the conventional charging circuit operates while monitoring the electric power input from the AC adapter 501 to a housing 500, the charging operation can be optimized for the allowable output power of the AC adapter, but the charging operation cannot be optimized for the allowable dissipation of the housing. Accordingly, it has conventionally been hard to estimate the total amount of generated heat. Therefore, the housing can be unnecessarily large to obtain a margin, or there may be the excess number of parts for radiation, thereby increasing the cost.

Figure 7:
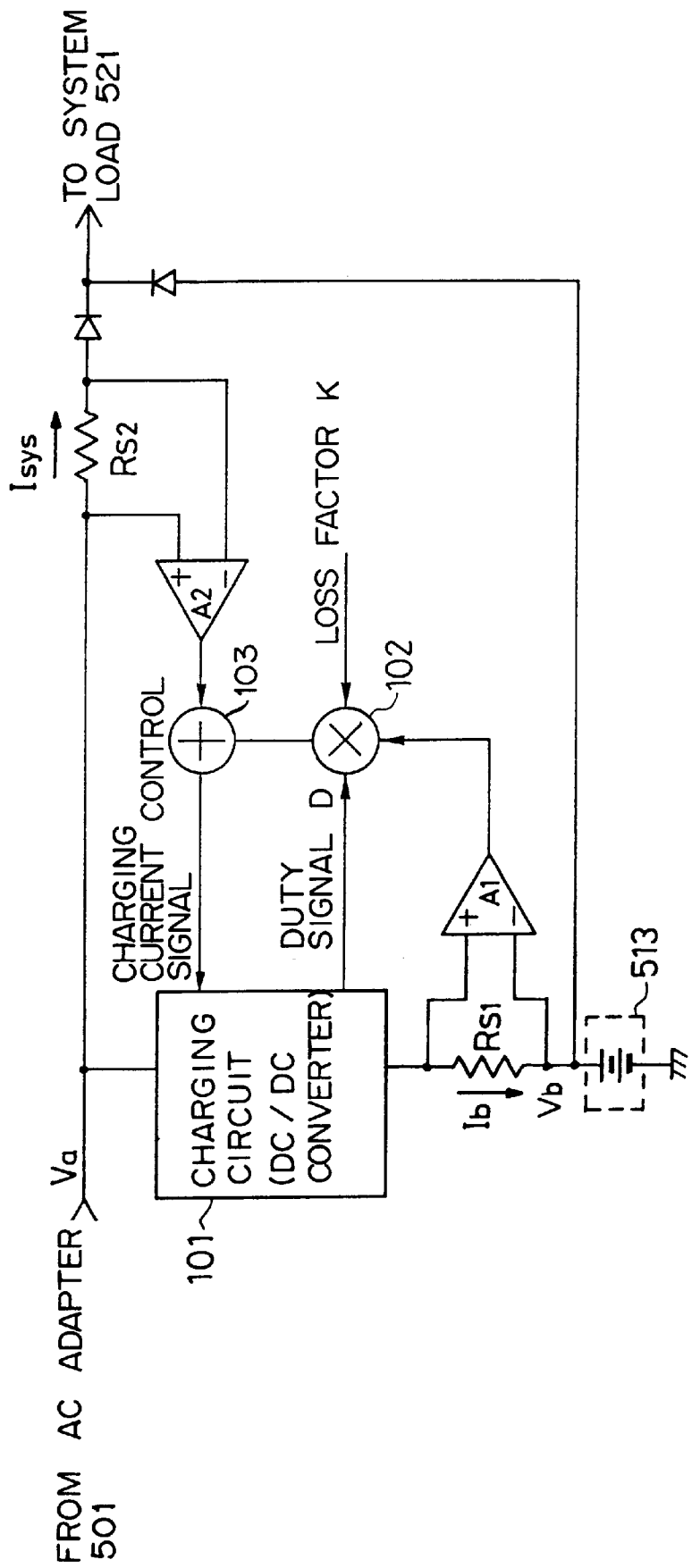
FIG. 7 is a block diagram of the charging circuit and the peripheral circuits operated by the charging method according to the third embodiment of the present invention.

FIG. 7 is a block diagram of the charging circuit and the peripheral circuits according to the present invention. In FIG. 7, the charging circuit operates according to the charging method of the third embodiment.

The charging circuit 101 is, in this example, a DC/DC converter operating in the PWM method. The charging circuit 101 is described below by referring to FIG. 8.

The switches M1 and M2 are alternately turned on and turned off depending on the state of a flipflop 113. While the switch M1 is in the ON state, the electric current flowing through a inductor L increases (ramps up). While the switch M1 is in the OFF state, the electric current flowing through the inductor L decreases (ramps down). Then, the output voltage Vb can be obtained by smoothing the voltage generated by that electric current. The output voltage Vb is a charging voltage for use in charging the battery 513.

An amplifier 111 outputs an instruction value signal Vcnt by amplifying an error between a predetermined reference voltage Vref and an output voltage Vb. The comparator 112 compares the instruction value signal Vcnt with a inductor current signal Vsense, and outputs a reset signal when the inductor current signal Vsense is larger. The inductor current signal Vsense indicates an electric current flowing through a inductor L, and is obtained as a voltage drop at the resistor Rs1. Therefore, the reset signal is generated when the inductor current exceeds an instruction value determined by the output voltage Vb.

The flipflop 113 is periodically set by a clock signal, and is reset by a reset signal generated by the comparator 112. This reset signal is transmitted from the comparator 112 to the flipflop 113 through an OR circuit 114. When the flipflop 113 is in a set state, the switch M1 enters the ON state, and the switch M2 enters the OFF state. On the other hand, when the flipflop 113 is in a reset state, the switch M1 enters the OFF state, and the switch M2 enters the ON state.

A signal indicating the ON/OFF state of the switch M1 is referred to as a "duty signal". The duty signal is a pulse signal. When the operation of the charging circuit 101 is stable, the time ratio of H-state to L-state of the signal is stable. Generally, the duty D is defined by the following equation where Th indicates the time period in which the duty signal is in the H-state while TL indicates the time period in which the duty D is in the L-state.

$$D = Th/(Th+TL)$$

When the operation of the charging circuit 101 is stable, the relationship between the input voltage Va of the charging circuit 101 and its output voltage Vb is represented by the duty D as follows.

$$Vb \approx D \cdot Va \qquad (1)$$

Thus, the charging circuit 101 uses the output voltage Vb and the inductor current (inductor current signal Vsense) as a feedback signal, and stabilizes the output voltage Vb into a predetermined value. At this time, the inductor current is limited by the above described instruction value (instruction value signal Vcnt). Practically, the peak value of the inductor current is controlled not to exceed the above described instruction value. The average value of the inductor current is a charging current to be supplied for the battery 513.

Back in FIG. 7, in the charging method according to the third method, the total electric power consumed in the housing 100 is obtained by adding the electric power R consumed by the charging circuit 101 to the electric power Q consumed by the system load 521 as described by referring to FIG. 5. The electric power R consumed by the charging circuit 101 is obtained based on the electric power output from the charging circuit 101 and the efficiency of the charging circuit 101. That is, when the method according to the third embodiment is adopted, the total consumed electric power P is represented by the following equation.

total electric power $P$=electric power transmitted to system load 521+electric power consumed by charging circuit $101=Va \cdot \text{Isys}+(\text{Win}-\text{Wout})$ \hfill (2)

In the equation (2), "Win" and "Wout" are respectively the input electric power to the charging circuit 101 and the output electric power from the charging circuit 101. Assuming that the efficient of the charging circuit 101 is η, the equation (2) above is expressed as follows.

total electric power $P=Va \cdot \text{Isys}+\text{Wout} \cdot ((1-\eta)/\eta) \therefore P=Va \cdot \text{Isys}+Vb \cdot Ib \cdot ((1-\eta)/\eta)=Va \cdot \text{Isys}+Vb \cdot Ib \cdot K$ \hfill (3)

In the equation (3), "K" indicates the ratio of the lost electric power to the charging electric power. In the following description, it may be referred to as a "loss factor". The relationship between the input voltage Va and the output voltage Vb is expressed by the equation (1) above. Therefore, the total electric power P consumed in the housing 100 is expressed by the following equation.

$P=Va \cdot D \cdot Ib \cdot K=Va \cdot (\text{Isys}+D \cdot Ib \cdot K)$ \hfill (4)

Figure 8:
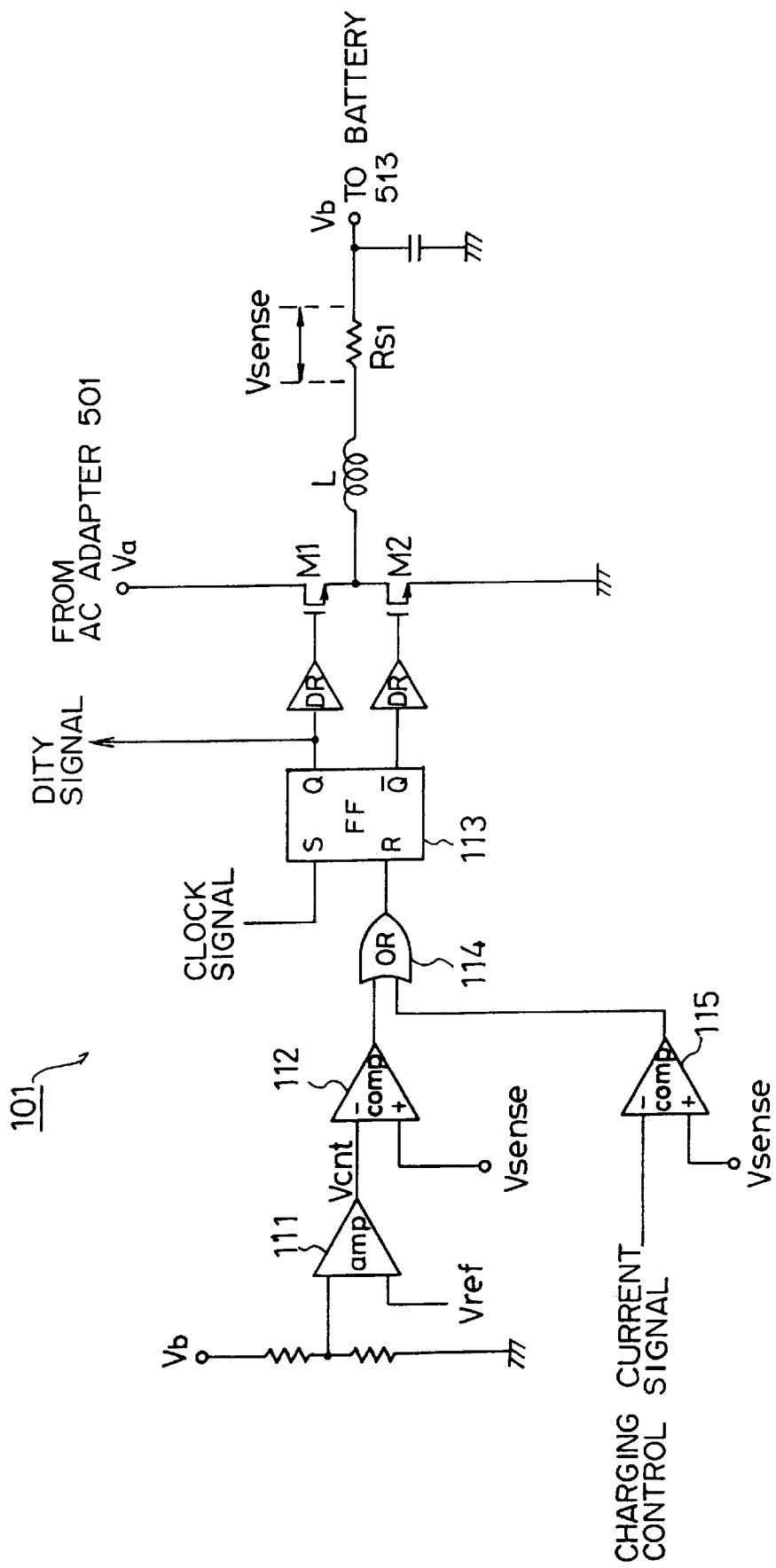
FIG. 8 shows the charging circuit.

In the equation (4), the voltage Va is the output voltage from the AC adapter 501, and can be assumed to be substantially constant. Therefore, the total electric power P consumed in the housing 100 can be expressed using "Isys+D·Ib·K".

where "D" indicates a duty signal used by the charging circuit 101, and controls the switch M1 shown in FIG. 8. The "K" indicates a loss factor representing the ratio of the lost electric power to the charging electric power, and is a known value. Accordingly, the loss factor K is predetermined. Furthermore, the "Ib" indicates a charging electric current to be supplied for the battery 513, and is obtained by amplifying the voltage drop of the resistor Rs1 using an amplifier A1. Then, the "D", "K", and "Ib" are multiplied by each other by the multiplication circuit 102.

On the other hand, "Isys" indicates an electric current to be supplied for the system load 521, and can be obtained by amplifying the voltage drop in the resistor Rs2 using an amplifier A2. An added 103 adds the output of the amplifier A2 to the output of the multiplication circuit 102. Then, the output of the adder 103 is supplied to the charging circuit 101 as a "charging current control signal".

The charging electric control signal is applied to a comparator 115 shown in FIG. 8. The comparator 115 compares the charging current control signal with the inductor current signal Vsense, and outputs a reset signal when the inductor current signal Vsense is larger. The inductor current signal Vsense indicates an electric current flowing through the 5inductor L as described above. Therefore, this reset signal is generated when the inductor current exceeds an instruction value determined by the charging current control signal.

The output from the comparator 115 is provided for the reset terminal of the flipflop 113 through the OR circuit 114. Accordingly, the flipflop 113 is reset when at least one of the comparator 112 and the comparator 115 generates a reset signal.

Figure 9A:
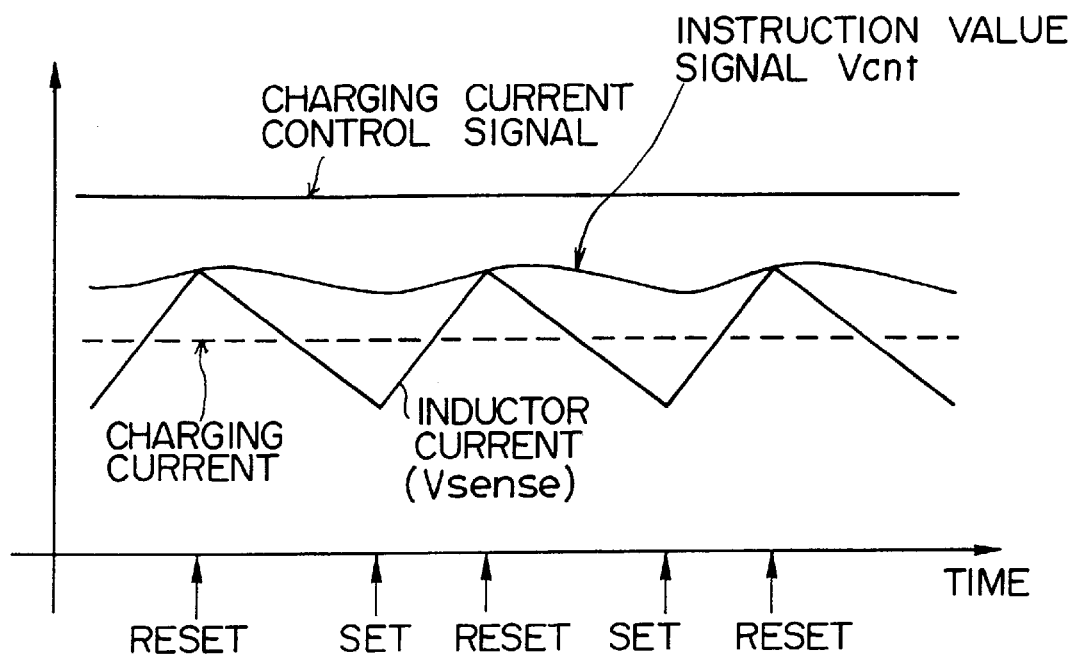
FIGS. 9A and 9B are timing charts of the operations of the charging circuit.
Figure 9B:
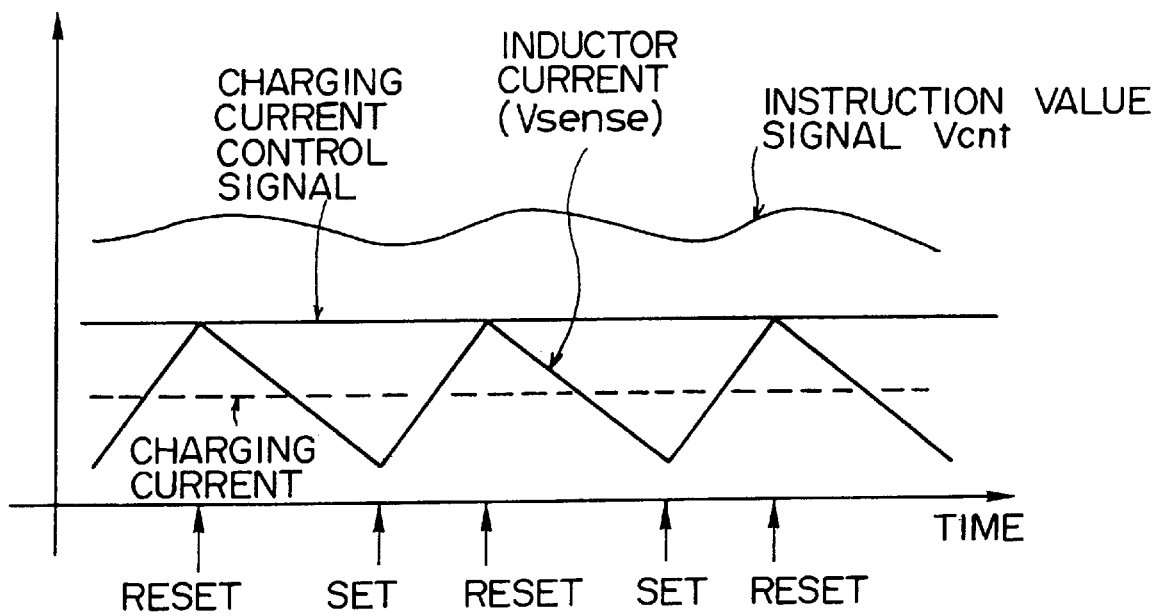

FIGS. 9A and 9B are timing charts for explanation of the operation of the charging circuit. FIG. 9A indicates the case where the amount of electric power consumed by the system load 521 is small. FIG. 9B indicates the case where the amount of electric power consumed by the system load 521 is large.

While the amount of electric power consumed by the system load 521 is small, the potential (charging current control level) applied to the comparator 115 is high, as shown in FIG. 9A. As a result, when the inductor current ramps up, the inductor current signal Vsense reaches the instruction value signal Vcnt before it reaches the charging current control level. In this case, the comparator 112 generates a reset signal, and the switch M1 is turned off. Thereafter, the inductor current ramps down until the next set signal is received.

On the other hand, when the amount of electric power consumed by the system load 521 is large, the charging current control level becomes low, as shown in FIG. 9B. Accordingly, when the inductor current ramps up, the inductor current signal Vsense reaches the charging current control level before reaching the instruction value signal Vcnt. In this case, a reset signal is generated by the comparator 115, and the switch M1 is turned off. Thereafter, the inductor current ramps down until the next set signal is received.

The charging current supplied for the battery 513 indicates a average value of the inductor current as described above. Therefore, the charging current supplied for the battery 513 decreases with an increasing amount of electric power consumed by the system load 521.

Figure 10:
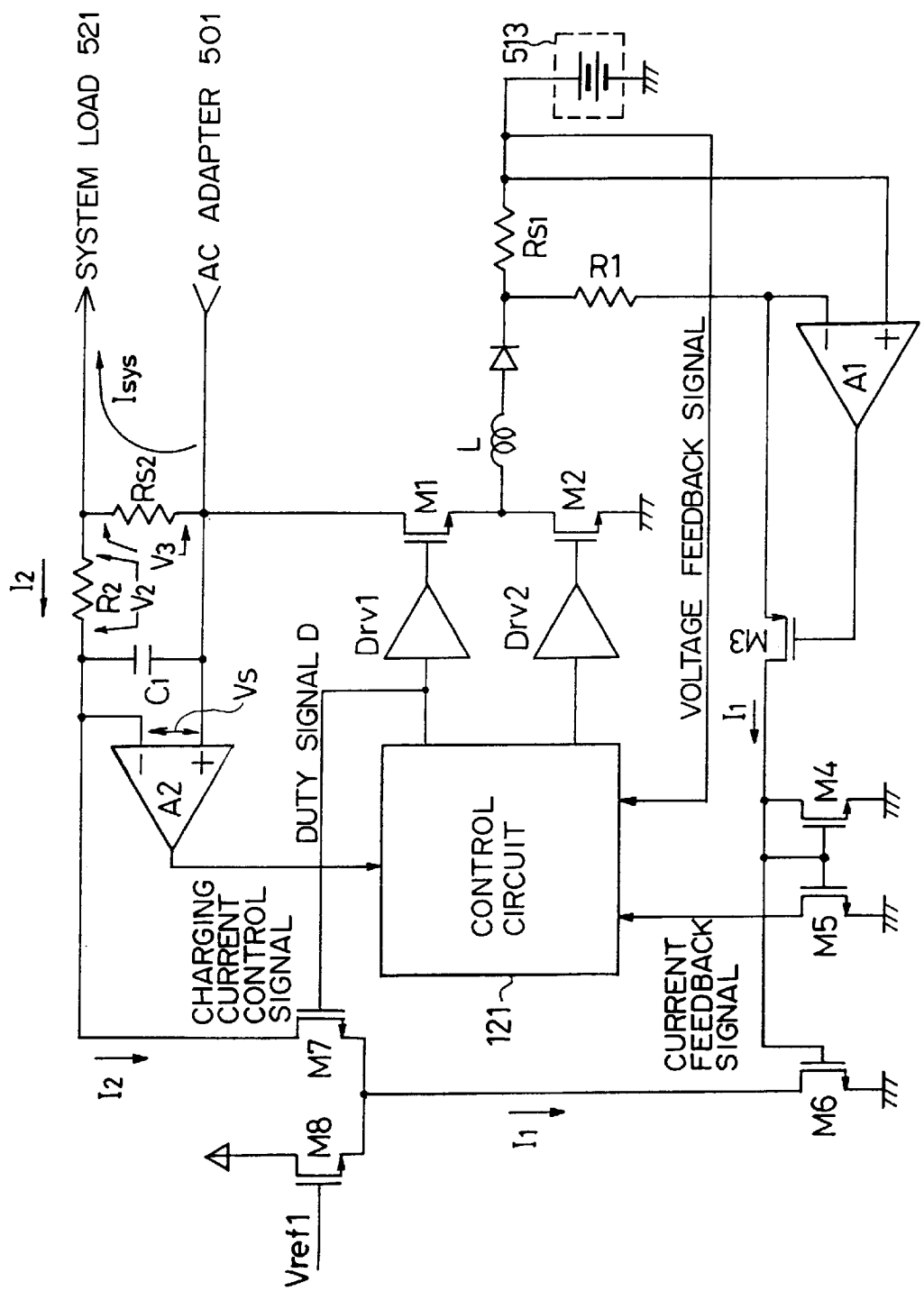
FIG. 10 is a block diagram of the charging circuit and the peripheral devices operated by the charging method according to the third embodiment of the present invention.

FIG. 10 shows the circuit for generating a charging current control signal by the charging method according to the third embodiment of the present invention.

A control circuit 121 corresponds to the amplifier 111, a comparator 112, the flipflop 113, the OR circuit 114, and the comparator 115 shown in FIG. 8. The multiplication circuit 102 shown in FIG. 7 corresponds to MOSFETs M3 through M8.

The amplifier A1 functions such that the end voltage of a resistor R1 (voltage across the resistor R1) matches the end voltage of the resistor Rs1 (voltage across the resistor Rs1), and passes an electric current I1 flowing through the resistor R1 to the MOSFET M4 through the MOSFET M3. The electric current I1 flowing through the MOSFET M4 is expressed as follows.

$I1=Ib \cdot (Rs1/R1)$ \hfill (5)

The MOSFETs M4 through M6 form a current mirror circuit. If the MOSFETs M4 through M6 are the same transistors, the electric current flowing through the MOSFET 4 also flows through the MOSFETs M5 and M6. Therefore, in this case, the electric current I1 flows through the MOSFET M6.

MOSFETs M7 and M8 are circuits for multiplying the electric current I1 by the duty D. A duty signal is applied to the control terminal of the MOSFET M7, and a constant voltage is applied to the control terminal of the MOSFET M8. Therefore, a average value (average electric current I2) of the electric current flowing through the MOSFET M7 is expressed by the following equation using the equation (5) above. Since the duty signal is a pulse signal, the electric current flowing through the MOSFET M7 has its current value periodically changed, but levelled by a capacitor C1.

$I2=D \cdot I1=D \cdot Ib \cdot (Rs1/R1)$ \hfill (6)

Therefore, using the equation (6), an end voltage V2 of a resistor R2 (voltage across the resistor R2) is expressed by the following equation.

$$V2 = R2 \cdot I2 = D \cdot Ib \cdot (R2/R1) \cdot Rs1 \qquad (7)$$

An end voltage V3 of the resistor Rs2 (voltage across the resistor Rs2) is expressed by the following equation.

$$V3 = Rs2(Isys + I2) \approx Rs2 \cdot Isys \qquad (8)$$

By the equations (7) and (8), a potential difference Vs between the input terminals of the amplifier A2 can be expressed by the following equation.

$$Vs = V2 + V3 = D \cdot Ib \cdot (R2/R1) \cdot Rs1 + Rs2 \cdot Isys = Rs2(Isys + D \cdot Ib(R2/R1) \cdot (Rs1/Rs2)) \qquad (15)$$

where, assuming that $(R1/R1) \cdot (Rs1/Rs2) = K$, the potential voltage Vs between the input terminals of the amplifier A2 is expressed by the following equation.

$$Vs = Rs2(Isys + D \cdot Ib \cdot K) \qquad (9)$$

When the equation (9) is compared with the equation (4), it is clear that the output from the amplifier A2 indicates the total electric power consumed in the housing 100. Therefore, the charging circuit 101 receives the output from the amplifier A2 as a "charging current control signal."

In FIGS. 6 through 10, the charging method according to the third embodiment is described, but any skilled person can realize the charging methods according to the first and second embodiments based on the descriptions in FIGS. 6 through 10, and the explanation about the drawings.

According to the present invention, the amount of generated heat from the housing containing a battery can be estimated based on the electric power consumed in the housing, and the battery is charged such that the amount of the generated heat can be equal to or smaller than a predetermined value, thereby optimizing the charging operation for the allowable dissipation of the housing. As a result, the entire system can be easily designed in consideration of generated heat, and it is expected that an unnecessarily large housing can be avoided in improving radiation capability.

What is claimed is:

1. A charging circuit, provided in a housing which contains a load and a battery capable of supplying electric power for the load, for charging the battery, comprising:

consumed power detection means for detecting total electric power consumed in the housing; and control means for controlling an electric current with which the battery is charged based on the total consumed electric power detected by said consumed power detection means and an allowable dissipation of the housing.

2. The charging circuit according to claim 1, wherein
    said consumed power detection means detects the total consumed electric power based on a difference between electric power input to the housing and electric power supplied for the battery.

3. The charging circuit according to claim 1, wherein
    said consumed power detection means detects the total consumed electric power based on an electric power value obtained by subtracting the electric power supplied for the battery from a sum of the electric power supplied for the load and electric power supplied for the charging circuit.

4. The charging circuit according to claim 1, wherein
    said consumed power detection means measures electric power consumed by the charging circuit based on efficiency of the charging circuit and the electric power supplied for the battery, and detects the total consumed electric power based on a sum of the electric power consumed by the charging circuit and the electric power supplied for the load.

5. The charging circuit according to claim 1, wherein
    said control means controls an electric current with which the battery is charged such that the total consumed electric power dose not exceed the allowable dissipation.

6. The charging circuit according to claim 1, wherein
    said allowable dissipation of the housing depends on radiation design of the housing.

7. A charger, provided in a housing which contains a load and a battery capable of supplying electric power for the load, for charging the battery, comprising:

a detector which detects total electric power consumed in the housing; and a controller for controlling an electric current with which the battery is charged based on the total consumed electric power detected by said detector and an allowable dissipation of the housing.

8. A method for charging a battery, said battery being capable of supplying electric power for a load, using a charging circuit provided in a housing which contains the load and the battery, comprising the steps of:

detecting total electric power consumed in the housing; and controlling an electric current with which the battery is charged based on the detected total consumed electric power and an allowable dissipation of the housing.

9. A computer readable medium having executable instructions stored thereon for carrying out the steps of claim 8.

* * * * *

UNITED STATES PATENT AND TRADEMARK OFFICE
CERTIFICATE OF CORRECTION

PATENT NO.    : 6,140,801
DATED         : October 31, 2000
INVENTOR(S)   : Aoki et al.

It is certified that error appears in the above-identified patent and that said Letters Patent is hereby corrected as shown below:

<u>Title page,</u>
Item [57], ABSTRACT,
Line 8, after "circuit)", delete "dose" and insert therefor -- does --.

<u>Column 2,</u>
Line 20, delete "results" and insert therefor -- result --.

<u>Column 5,</u>
Line 40, after "101", delete "can".

<u>Column 6,</u>
Line 53, before "(1)", insert therefor -- ….. --.

<u>Column 7,</u>
Line 11, before "(2)", insert therefor -- ….. --.
Line 19, before "(3)", insert therefor -- ….. --.
Line 28, before "(4)", insert therefor -- ….. --.
Line 61, delete "5inductor" and insert therefor -- inductor --.

<u>Column 8,</u>
Line 47, before "(5)" insert therefor -- ….. --.
Line 59, delete "a", insert therefor -- an --.
Line 66, before "(6)" insert therefor -- ….. --.

UNITED STATES PATENT AND TRADEMARK OFFICE
CERTIFICATE OF CORRECTION

PATENT NO. : 6,140,801
DATED : October 31, 2000
INVENTOR(S) : Aoki et al.

It is certified that error appears in the above-identified patent and that said Letters Patent is hereby corrected as shown below:

Column 9,
Line 5, before "(7)", insert therefor -- ..... --.
Line 8, after "Rs2", insert therefor -- ..... --.
Line 8, before "(8)", insert therefor -- ..... --.
Line 22, before "(9)", insert therefor -- ..... --.

Column 10,
Line 26, delete "dose" and insert therefor -- does --.

Signed and Sealed this

Eleventh Day of February, 2003

JAMES E. ROGAN
*Director of the United States Patent and Trademark Office*